United States Patent
McGarry et al.

(10) Patent No.: US 10,003,417 B2
(45) Date of Patent: Jun. 19, 2018

(54) CONTROLLABLE MULTI-USER MIMO TESTBED

(71) Applicant: Octoscope Inc., Littleton, MA (US)

(72) Inventors: Andrew McGarry, Bolton, MA (US); Ron Cook, Groton, MA (US)

(73) Assignee: Octoscope Inc., Littleton, MA (US)

( * ) Notice: Subject to any disclaimer, the term of this patent is extended or adjusted under 35 U.S.C. 154(b) by 0 days. days.

(21) Appl. No.: 15/466,018

(22) Filed: Mar. 22, 2017

(65) Prior Publication Data

US 2017/0279546 A1    Sep. 28, 2017

Related U.S. Application Data

(60) Provisional application No. 62/311,721, filed on Mar. 22, 2016.

(51) Int. Cl.
*H04B 17/15* (2015.01)
*H04B 7/0452* (2017.01)

(52) U.S. Cl.
CPC .......... *H04B 17/15* (2015.01); *H04B 7/0452* (2013.01)

(58) Field of Classification Search
CPC .............. H04B 7/0413; H04B 17/0085; H04B 17/0087; H04B 17/21; H04B 17/336; H04B 17/391; H04B 17/3911; H04B 17/29; H04B 17/3912; H04B 7/0452; H04B 17/00; H04B 17/102; H04B 17/11; H04B 17/12; H04B 17/14; H04B 17/16; H04W 24/06; H04W 24/08; H04W 24/10; H04W 72/042; H04W 72/1231
See application file for complete search history.

(56) References Cited

U.S. PATENT DOCUMENTS

| | | | | |
|---|---|---|---|---|
| 2007/0243826 A1* | 10/2007 | Liu | ..................... | H04B 17/3911 455/67.11 |
| 2010/0171650 A1* | 7/2010 | Okano | ..................... | H04B 7/04 342/173 |
| 2012/0122406 A1* | 5/2012 | Gregg | ................. | H04L 43/0882 455/67.11 |
| 2014/0122049 A1* | 5/2014 | Kyosti | ............... | G01R 29/0821 703/13 |
| 2015/0054687 A1* | 2/2015 | Reed | .................. | H04B 17/0085 342/361 |
| 2016/0212641 A1* | 7/2016 | Kong | ................. | H04B 17/0087 |

* cited by examiner

Primary Examiner — Golam Sorowar
(74) *Attorney, Agent, or Firm* — Intrinsic Law Corp.

(57) ABSTRACT

Systems and methods for design and testing of RF components are described. One or more RF isolation chambers are used to house MU-MIMO capable devices under test, including wireless access points and client devices. Spatial and angular positioning of the antennas within a chamber and controlled power of the signals into each antenna via RF combiners and RF attenuators to achieve a controllable apparent/virtual angular spread among the respective client device signals is described.

18 Claims, 8 Drawing Sheets

US 10,003,417 B2

CONTROLLABLE MULTI-USER MIMO TESTBED

RELATED APPLICATIONS

This application claims priority to U.S. Provisional Application No. 62/311,721, titled "Multi User MIMO Testbed and Correlation Control Circuit," filed on Mar. 22, 2016, the disclosure of which is hereby incorporated by reference.

TECHNICAL FIELD

The present disclosure relates to the design and testing and emulation of wireless communication systems and components such as used in wireless communication devices and appliances.

BACKGROUND

Wireless communication has grown to encompass a huge variety of information transactions between electronic machines. These include cellular communications between hand-held units and base stations, wireless communications between peer devices or client-server devices. To enhance the performance of wireless communication systems, multiple input multiple output (MIMO) wireless communication systems can include a plurality of radios at the transmitting or receiving devices of a two-way wireless communication system. Previously, a MIMO station or access point (AP) could only communicate with one device at time on a given frequency channel. Recently, multi user MIMO systems (MU-MIMO) have been developed to further advance the wireless communication capabilities to support simultaneous communication in the same frequency channel with a plurality of devices. FIG. 1 illustrates an MU-MIMO test system featuring a wireless AP 100 coupled over Ethernet 105 to a computer 120 handling transmit and receive data related to communications over the air (OTA) among several MU-MIMO stations 121-123 via AP 100. AP 100 and all three MU-MIMO stations 121-123 can implement the MU-MIMO mechanism according to, for example, 802.11ac or 802.11ax.

Testing wireless devices in an uncontrolled open air RF environment, such as the one presented in FIG. 1, is difficult due to uncontrolled interference and random reflections. MU-MIMO OTA testing is highly challenging because it requires repeatable conditions and specific device positioning in order to achieve repeatable and reliable results.

Shortcomings of controlled test systems include that they generally are carried out in a "conducted" test fashion, where the antenna of the device under test is removed and an RF cable connected directly to the antenna port of the radio. While this improves repeatability, conducted testing is unsuitable for measuring MU-MIMO gain, since antenna elements are involved in the MU-MIMO beamforming techniques and must be part of the test.

Therefore, for testing MU-MIMO performance, a better test environment and method are desired.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

In an aspect, the invention is directed to a communication test environment for testing multi-user multiple input multiple output (MU-MIMO) capable devices. The communication test environment comprises a test chamber having electrically isolating walls; at least one MU-MIMO capable access point (AP) disposed in the test chamber; a plurality of repositionable test antennas distributed within said test chamber, each test antenna having a respective line of sight (LOS) to said AP, wherein an angular position of any of said test antennas about said AP is determined according to an Angle of Arrival (AoA), with respect to an arbitrary reference axis that passes through said AP, of RF transmissions from said test antenna to said AP; a plurality of MU-MIMO capable stations, each MU-MIMO capable station coupled to at least one of said test antennas; and a computer coupled to the AP, the computer configured to run a first aggregate throughput test when an MU-MIMO mechanism in the AP and in one or more of the stations is enabled, the computer further configured to run a second aggregate throughput test when said MU-MIMO mechanism in the AP or in said one or more of the stations is disabled.

In one or more embodiments, the first throughput test comprises sending a first volume of data from the computer simultaneously to said stations via said AP when said MU-MIMO mechanism is enabled, and the second throughput test comprises sending a second volume of data from said computer to said stations via said AP when said MU-MIMO mechanism is disabled. In one or more embodiments, the communication test environment further comprises a positioning platform disposed within said test chamber, on which the AP is mechanically placed, said positioning platform being positionable in response to control signals from said computer or from a second computer to translate said positioning platform, to rotate said platform, or a combination thereof within said test chamber. In one or more embodiments, each said station is coupled to a corresponding at least one RF path extending from its antenna port, through an RF feed-through connector that passes through a test chamber wall, and into said test chamber to connect to at least one of said test antennas. In one or more embodiments, said RF feed-through connector having a first connection point on an exterior side of said walls and a corresponding second connection point on an interior side of said walls, the first and second connection points in electrical communication with one another so as to enable coupling of an exterior and an interior conductor to the first and second connection points, respectively. In one or more embodiments, the communication test environment further comprises an RF attenuator disposed in at least one of the RF paths.

In one or more embodiments, a first group (N) of said stations is coupled to a first test antenna, via a 1:N RF splitter and a first RF path that extends from a common port of said 1:N RF splitter to said first antenna through a first RF feed-through connector in a first test chamber wall, so as to emulate a first co-located group of MU-MIMO capable stations connected to said AP at an angular position of said first test antenna. In one or more embodiments, a second group (M) of said stations is coupled to a second test antenna, via a 1:M RF splitter and a second RF path that extends from a common port of said 1:M RF splitter to said second antenna through a second RF feed-through connector in the first or a second test chamber wall, so as to emulate a second co-located group of said stations connected to said AP at an angular position of said second test antenna. In one or more embodiments, another station is coupled to a common port of a 1:X splitter, the 1:X splitter having at least first and second RF ports, said first RF port coupled to an RF port of the 1:N splitter via a third RF path, said second RF port coupled to an RF port of the 1:M splitter via a fourth RF path, whereby the third station is coupled to the first and second test antennas. In one or more embodiments, the communication test environment further comprises a first RF attenuator disposed in said third RF path and a second RF attenuator disposed in said fourth RF path.

In one or more embodiments, at least one of said stations is coupled to a common port of a 1:X splitter, the 1:X splitter having at least first and second RF ports, said first RF port coupled to a first test antenna via a first RF path that passes through a first RF feed-through connector in a first test chamber wall, said second RF port coupled to a second test antenna via a second RF path that passes through a second RF feed-through connector in the first or a second test chamber wall, whereby at least one of said stations is coupled to the first and second test antennas. In one or more embodiments, the communication test environment further comprises a first RF attenuator disposed in said first RF path and a second RF attenuator disposed in said second RF path.

In one or more embodiments, said test antennas are spatially distributed about said AP so that a difference between the AoA of said RF transmissions from each pair of adjacent test antennas is maximized. In one or more embodiments, the communication test environment further comprises an RF interference generator coupled to at least one antenna disposed in said test chamber. In one or more embodiments, each MU-MIMO capable station is an N×N MU-MIMO capable station having N antenna ports, each of said N antenna ports coupled to a different RF path, each such RF path extending to at least one of said test antennas, wherein N is an integer greater than or equal to 1.

Another aspect of the invention is directed to a method for testing multi-user multiple input multiple output (MU-MIMO) capable devices. The method comprises placing an MU-MIMO capable access point (AP) in a test chamber having electrically isolating test chamber walls; placing a plurality of repositionable test antennas in said test chamber, wherein each test antenna has a respective line of sight (LOS) to said AP and an angular position of any of said test antennas about said AP is determined according to an Angle of Arrival (AoA) of RF transmissions from said test antenna to said AP with respect to an arbitrary reference axis that passes through said AP; coupling each test antenna to at least one MU-MIMO capable station; coupling a computer to said AP; running a first MU-MIMO aggregate throughput test between said computer and said stations via said AP when an MU-MIMO mechanism in the AP and in one or more of said stations is enabled; and running a non-MU-MIMO aggregate throughput test when said MU-MIMO mechanism in the AP or in said one or more of said stations is disabled.

In one or more embodiments, the method further comprises determining a MU-MIMO gain by dividing a MU-MIMO aggregate throughput by a non-MU-MIMO aggregate throughput. In one or more embodiments, the method further comprises coupling an antenna port of each station in a first group (N) of stations to a first respective RF path that extends from said antenna port to an RF port of a 1:N RF splitter; and coupling a common port of said 1:N RF splitter to a second RF path that extends from said common port to a first test antenna in said test chamber via an RF feed-through connector in one of said test chamber walls, whereby said first group of stations shares said angular position of said first test antenna and therefore emulates a co-located group of MU-MIMO capable stations coupled to said AP.

In one or more embodiments, the method further comprises coupling an antenna port of a first station to a first RF path that extends from said antenna port to a common port of an RF splitter; coupling a first RF port of said RF splitter to a second RF path that extends from said first RF port to a first test antenna in said test chamber via a first RF feed-through connector in a first test chamber wall; and coupling a second RF port of said RF splitter to a third RF path that extends from said second RF port to a second test antenna in said test chamber via a second RF feed-through connector in the first or a second test chamber wall, wherein RF signals emitted by said first and second test antennas emulates a virtual AoA of said first station with respect to said AP, said virtual AoA between a first AoA of said first test antenna and a second AoA of said second test antenna.

In one or more embodiments, the method further comprises disposing a first RF attenuator in said second RF path; disposing a second RF attenuator in said third RF path; adjusting a relative level of attenuation on said first and second attenuators to change a relative power of RF transmissions in said second and third RF paths, whereby said relative level of attenuation controls said virtual AoA of said first station with respect to said AP. In one or more embodiments, the method further comprises spatially distributing said test antennas about said AP so that a difference between the AoA of said RF transmissions from each pair of adjacent test antennas is maximized. In one or more embodiments, the method further comprises electrically coupling an antenna port of one of said wireless stations to an RF path that extends through an RF feed-through connector in one of said test chamber walls and into said test chamber to connect to at least one of said test antennas.

IN THE DRAWINGS

For a fuller understanding of the nature and advantages of the present invention, reference is made to the following detailed description of preferred embodiments and in connection with the accompanying drawings, in which.

DETAILED DESCRIPTION

Figure 1:
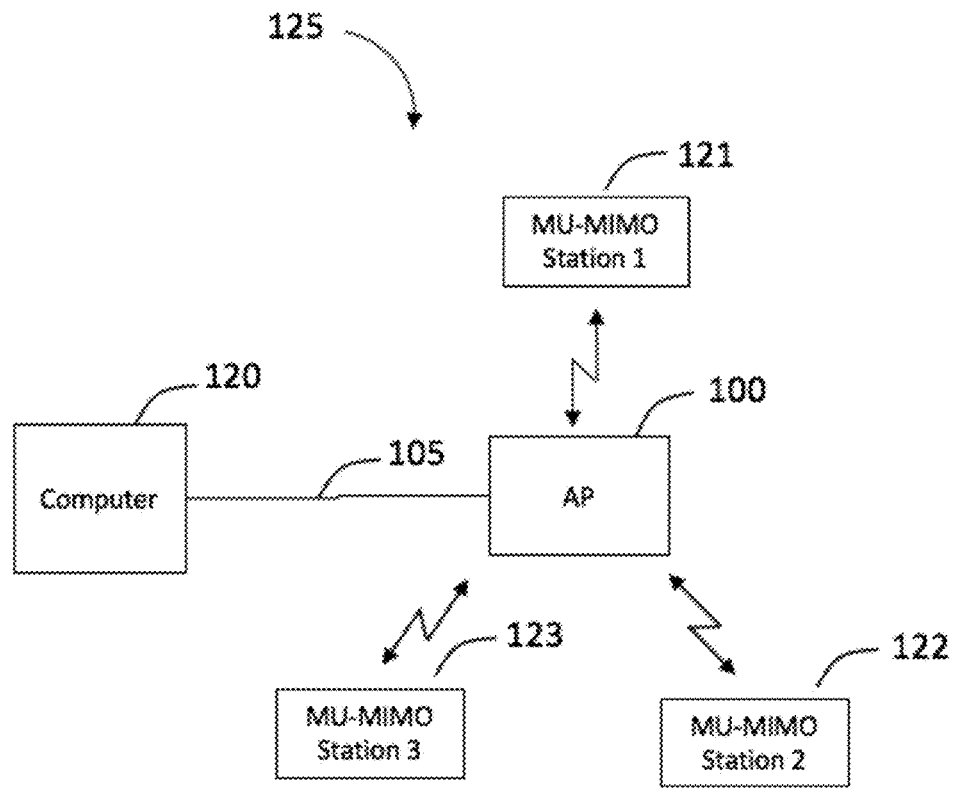
FIG. 1 is a block diagram of an example prior art MU-MIMO test configuration with one MU-MIMO wireless AP and three MU-MIMO stations.
Figure 2:
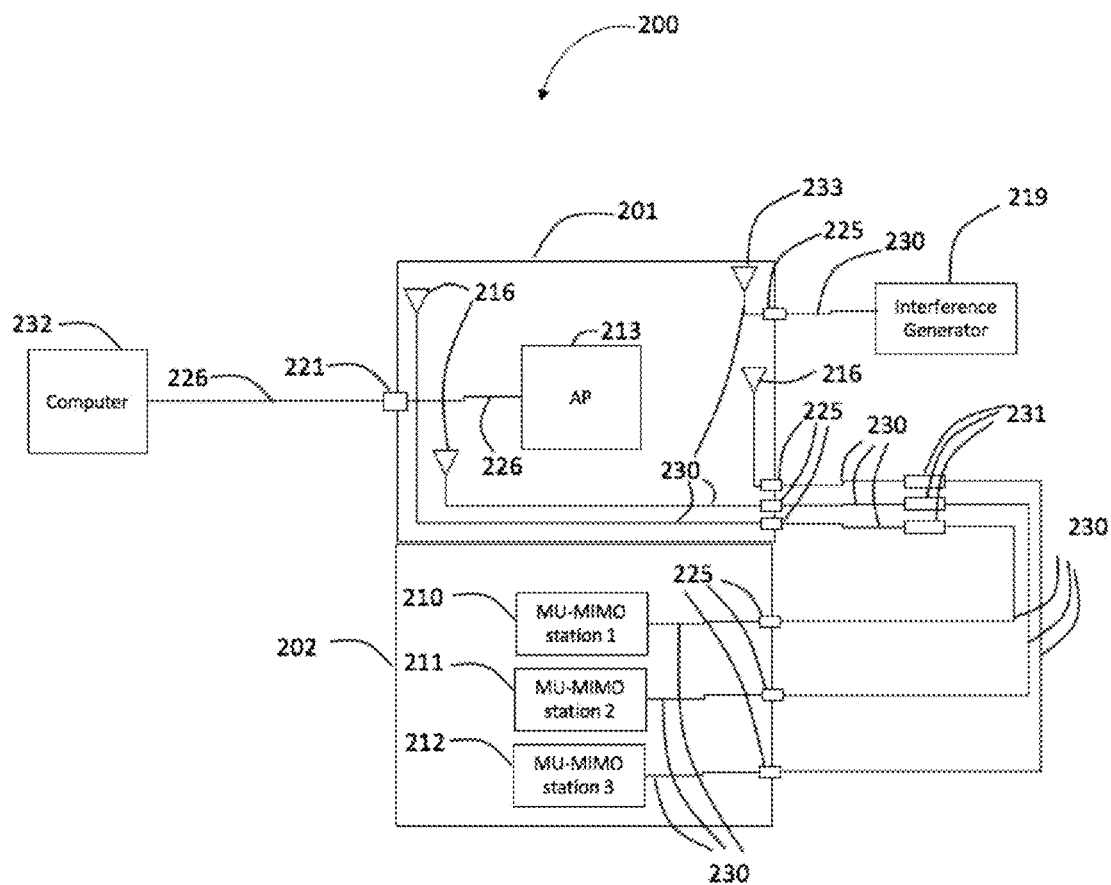
FIG. 2 illustrates an exemplary MU-MIMO test configuration with two electrically isolated, semi-anechoic chambers, one MU-MIMO wireless AP, and three MU-MIMO stations according to one or more embodiments.

FIG. 2 illustrates an exemplary MU-MIMO test configuration with two electrically isolated, semi-anechoic chambers 201-202, one MU-MIMO capable wireless AP 213, and three MU-MIMO capable stations 210-212 according to one or more embodiments. The AP 213 and stations 210-212 are collectively referred to as devices under test (DUT) 210-213, though it is noted that in other embodiments only one of these devices may be a DUT. The DUTs 210-213 are placed inside chambers 201-202 to isolate the DUTs 210-213 from RF transmissions generated by external sources. It is noted that chamber 202 is optional.

Each of the MU-MIMO stations 210-212 establishes a wireless connection with the AP 213 via a respective RF path, which can include any connecting medium, or series of connecting mediums, which allow RF transmissions to be exchanged between two wireless devices. Some examples of connecting mediums include coaxial cables, waveguides, RF feed-through connectors, and isolated over-the-air (OTA) couplings, but those skilled in the art will recognize that other means of coupling RF devices are possible. In FIG. 2, the RF paths which connect the AP 213 to each of the MU-MIMO stations 210-212 are comprised of OTA coupling between the AP 213 and test antennas 216 within chamber 201, feed-through connectors 225 in one or more walls of chamber 201 coupled to said test antennas 216, and electrically shielded coaxial cables 230. Feed-through connectors 225, such as SMA, N, or other types of feed-through connectors, are built into the chamber walls and couple RF test signals through the metal walls of chambers 201-202. The feed-through connectors 225 include a first connection point on an exterior side of a chamber 201 wall and a corresponding second connection point on an interior side of said chamber 201 wall. The first and second connection points are in electrical communication with one another so as to enable coupling of an exterior conductor (e.g., coaxial cable 230 outside of the chamber 201) and an interior conductor (e.g., a test antenna 216 or a coaxial cable 230 inside the chamber 201) to the first and second connection points, respectively. Test signals are coupled via these feed-through connectors 225 and via coaxial cables 230 to the MU-MIMO stations 210-212 in chamber 202 (e.g., to an antenna port in each of the MU-MIMO stations 210-212), completing the RF paths between AP 213 and MU-MIMO stations 210-212. Those skilled in the art will recognize that there are many configurations for the RF paths that AP 213 and MU-MIMO stations 201-212 use to establish RF communications sessions.

The interior walls of chambers 201-202 can be covered with an RF-absorber to reduce reflections from the metal walls of chambers 201-202. The RF absorber should be selected so that the reflections resemble real-life indoor RF environments. Examples of RF absorbers include Cummings Microwave LF77 RF absorptive foam. Examples of the construction and/or configuration of one or both of chambers 201, 202 can be found in U.S. Patent Application Publication No. 2013/0257468, which are hereby incorporated by reference.

Reflecting test signals within chambers 201-202 create multiple paths through space for transmissions between the AP 213 and MU-MIMO stations 210-212, enhancing MU-MIMO throughput. Filtered Ethernet connection 221 couples Ethernet from computer 232 through the walls of chamber 201 while filtering out external RF signals radiating in frequency bands used during testing. This filter could be designed to couple other types of data interfaces (e.g. USB, HDMI, etc.) through the walls of chamber 201. Computer 232 can be configured to run one or more tests to measure throughput performance of one or more of the DUTs 201-213. In one example, computer 232 is configured to run a first aggregate throughput test when the MU-MIMO mechanism in AP 213 and some or all of the stations 210-212 is enabled and a second aggregate throughput test when the MU-MIMO mechanism in AP 213 and in stations 210-212 is disabled. Additional details of these aggregate throughput tests are described below with reference to FIG. 3.

Test configuration 200 includes an optional interference generator 219 coupled via an RF path to an antenna 233 disposed in the test chamber 201. In other embodiments, the interference generator 219 can be disposed in the test chamber 201 or in a separate electrically isolated chamber. The interference generator 219 can produce RF energy in specific frequency bands and/or in specific patterns for the purpose of disrupting wireless communications. The interference generator 219 can be used to occupy the wireless medium shared by the AP 213 and MU-MIMO stations 210-212 (i.e., the OTA coupling in chamber 201) in order to model interference from adjacent networks or from random wireless devices, thereby triggering wireless adaptation mechanisms in the AP 213 and MU-MIMO stations 210-212. This interference generator 219 could be programmable and be used to model time-variable RF interference to emulate real-life in-range wireless networks and other sources of interference.

Attenuators 231 can be placed in at least one of the RF paths between any of the MU-MIMO stations 210-212 and the AP 213 (e.g., via electrically shielded coaxial cables 230 in the RF path) to model wireless channel path loss. Each of the attenuators 231 could be programmatically controlled (e.g., via computer 232 or another computer) to model time-variable path loss.

In some embodiments, each station 210-212 is disposed in a separate electrically isolated, semi-anechoic chamber.

This is only an exemplary configuration. Those skilled in the art recognize that the components in this configuration 200 can be arranged and distributed in different chambers or combined into the same chamber. The example configuration showing in FIG. 2 supports single input single output (SISO), or 1×1 MU-MIMO capable stations. 2×2 MU-MIMO capable stations can each have 2 antenna ports, requiring that each antenna 216 be replaced by 2 such antennas, each such antenna coupled through a respective RF path to one of the antenna ports of each 2×2 MU-MIMO capable station. In general, an N×N MU-MIMO capable station can have N antenna ports, requiring that each test antenna 216 be replaced by N such antennas, each such test antenna coupled through a respective RF path to one of the antenna ports of each N×N MU-MIMO station. N can be any integer greater than or equal to 1. In one example, each of the N antenna ports of a given N×N MU-MIMO capable station is coupled to a different test antenna. In another example, one or more of the N antenna ports of each N×N MU-MIMO capable station in a plurality of N×N MU-MIMO capable stations are grouped together (e.g., via a splitter as described above) so that they are all coupled to at least one test antenna. In another example, a plurality of N×N MU-MIMO capable stations are coupled to the test antennas, where the integer N is the same or different for each N×N MU-MIMO capable station.

Figure 3:
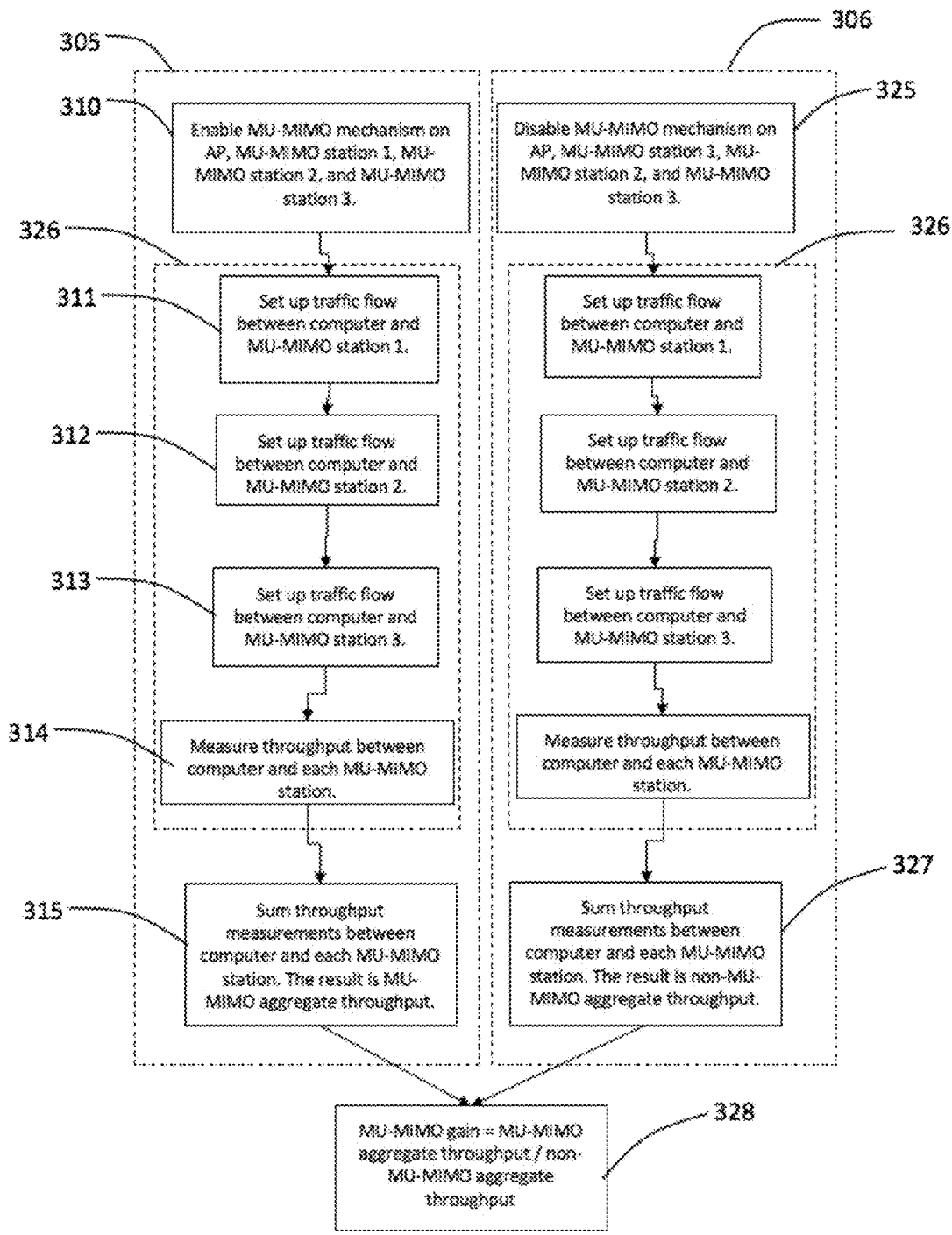
FIG. 3 is a flowchart which depicts a method for calculating MU-MIMO gain in an MU-MIMO test system according to one or more embodiments.

FIG. 3 is a flowchart that depicts a method for calculating MU-MIMO throughput gain in an MU-MIMO test system, such as the one depicted in FIG. 2, according to one or more embodiments. Two throughput tests are run. During the MU-MIMO throughput test 305, MU-MIMO mechanisms are enabled 310 on AP 213, MU-MIMO station 210, MU-MIMO station 211, and MU-MIMO station 212. A traffic generator software tool (e.g. iPerf, available at <https://iperf.fr/>) is then used to set up 311 a traffic flow between the computer 232 and MU-MIMO station 210. Traffic flows are also set up 312 between the computer 232 and MU-MIMO station 211 and set up 313 between the computer 232 and MU-MIMO station 212. In each traffic flow, a volume of data is sent from the computer 232 to the respective MU-MIMO station 210-212. Throughput is then measured 314 between the computer 232 and each MU-MIMO station 210-212. The throughput measurements between the computer 232 and each MU-MIMO station 210-212 are then summed 315 together. The result of this summation is the MU-MIMO aggregate throughput for the MU-MIMO system 200.

The first step of the non-MU-MIMO throughput test 306 is to disable 325 the MU-MIMO mechanism on the AP 213, MU-MIMO station 210, MU-MIMO station 211, and MU-MIMO station 212. Test sequence 326 is the same for both the MU-MIMO throughput test 305 and the non-MU-MIMO throughput test 306. The throughput measurements between the computer 232 and each MU-MIMO station 210-212 are then summed 327 together. The result of this summation is the non-MU-MIMO aggregate throughput for the MU-MIMO system 200.

Figure 4:
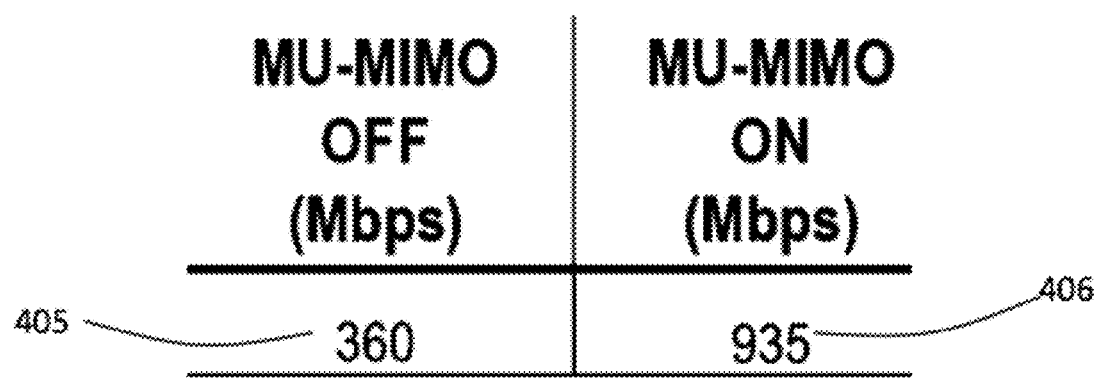
FIG. 4 is a depiction of example MU-MIMO aggregate throughput and non-MU-MIMO aggregate throughput results for an MU-MIMO system with three MU-MIMO stations.

Finally, the MU-MIMO gain is calculated 328. MU-MIMO gain is equal to the MU-MIMO aggregate throughput divided by the non-MU-MIMO aggregate throughput. For example, FIG. 4 shows example non-MU-MIMO aggregate throughput 405 and MU-MIMO aggregate throughput 406 results for an MU-MIMO system with three MU-MIMO stations. The MU-MIMO gain for this example system is:

MU-MIMO gain=935 Mbps/360 Mbps=2.60

Those skilled in the art recognize that the number of MU-MIMO stations included in an MU-MIMO system can vary. The aggregate throughput is a sum of individual throughput measurements to any number of MU-MIMO stations in an MU-MIMO system.

Figure 5A:
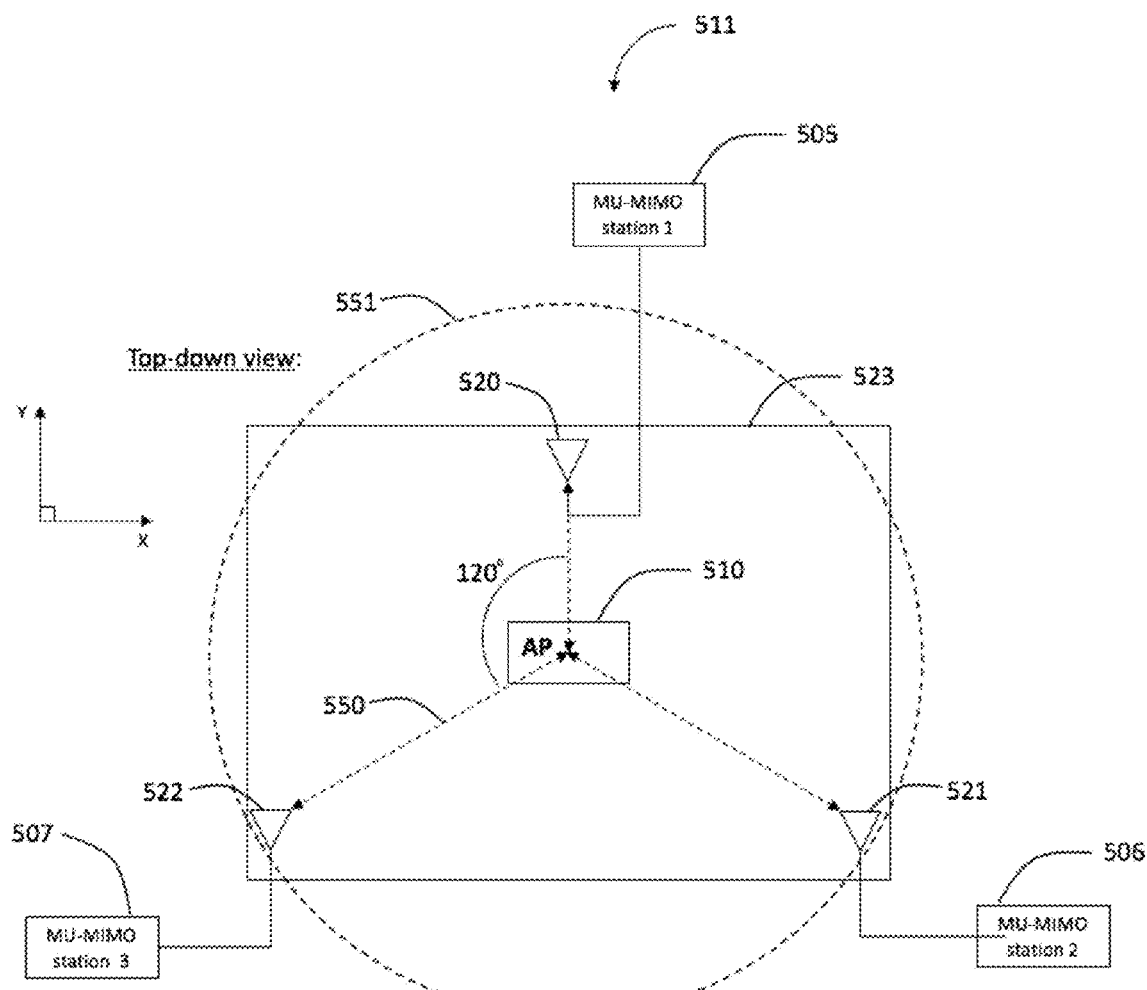
FIGS. 5A and 5B illustrate an exemplary MU-MIMO test configuration with three MU-MIMO stations and three test antennas according to one or more embodiments.
Figure 5B:
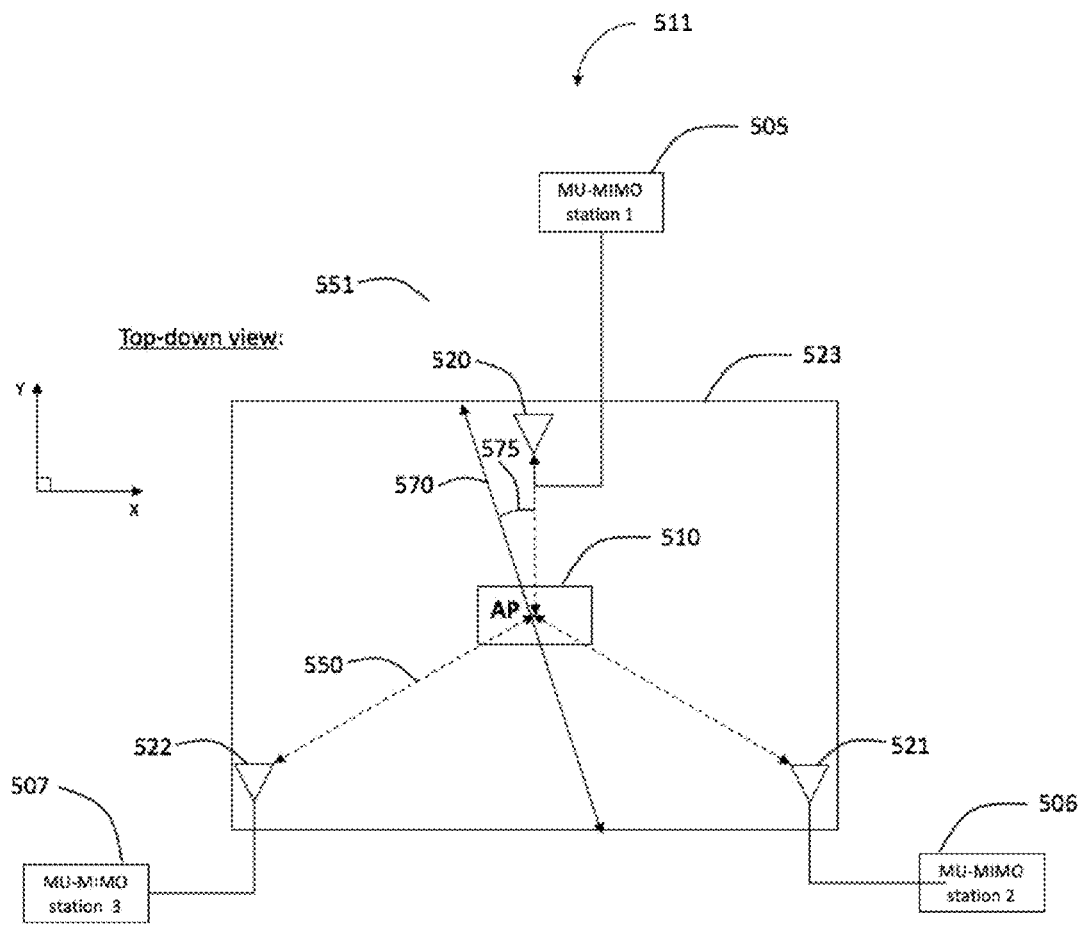

FIGS. 5A and 5B illustrate an exemplary MU-MIMO test configuration with three MU-MIMO stations 505-507 and three test antennas 520-522 according to one or more embodiments. Test antennas 520-522 are distributed in test chamber 523 such that they each have line of sight (LOS) to AP 510. Having a LOS to AP 510 means that the test signals radiating from test antennas 520-522 to the AP 510 (or vice versa) are unobstructed by any objects. The angular position of a test antenna is the angle of arrival at AP 510 of RF transmissions emitted from the test antenna, with respect to an arbitrary reference axis that passes through AP 510 (e.g., reference axis 570 illustrated in FIG. 5B). The angular position of a test antenna is also the angle of departure of RF signals emitted from AP 510 and received at the test antenna, with respect to said reference axis. The angle of arrival at the AP and the angle of departure from the AP can be based on one of the imaginary lines that extends between the test antenna (e.g., a center of the test antenna) and the AP. The signal path used to determine the angle of arrival/departure for each antenna 520-522 is indicated as dashed lines 550 in FIGS. 5A and 5B. For example, the angle of arrival and the angle of departure of RF transmissions from/to test antenna 520 is angle 575 with respect to reference axis 570, as illustrated in FIG. 5B. In the case of MU-MIMO enabled operation, AP 510 forms a plurality of (in this example 3) simultaneous electromagnetic beams, each beam directed at its target test antenna 520-522.

Angular spread refers to the total range of angles of arrival/departure possible with given test antenna positions. In example system 511, the angular spread is 360°. MU-MIMO gain is maximized when the angular spread between each pair of adjacent test antennas 520-522 around the AP 510 is maximized. For example, in FIG. 5A, the angular spread between adjacent test antennas 520 and 522 is 120°. The angular positions and angular spread of the test antennas 520-522 around AP 510 affect the MU-MIMO gain of the MU-MIMO system.

Those skilled in the art will recognize that the number of test antennas 520-522 in system 511 as well as the placement of those antennas within the chamber 523 may vary.

In some embodiments, the test antennas 520-522 are distributed in test chamber 523 along a virtual circle 551 about AP 510. In addition, the test antennas 520-522 can be distributed such that the angle between adjacent test antennas (e.g., between antennas 521 and 522, between antennas 521 and 520, and between antennas 520 and 522) is equal or substantially equal. For example, the angle between adjacent test antennas can be 360°/n, where n is the number of test antennas. Thus, when n=3 (as in FIGS. 2 and 5), the angle between adjacent test antennas can be 120°. When n=4, the angle between adjacent test antenna can be 90°, and so on. In some embodiments, antennas 521-523 and AP 510 are co-planar. In other embodiments, antennas 521-523 and AP 510 are not co-planar. For example, each antenna 521-523 can be disposed at a different height in chamber 523 while maintaining a desired (e.g., maximum) angular separation. In one example, the antennas 521-523 are disposed along a virtual sphere about AP 510 while maintaining a desired (e.g., maximum) angular separation. It is noted that the terms virtual circle 551 and virtual sphere are used in the conceptual sense, and their use does not imply the shape or geometry of test chamber 523.

In some embodiments, one or more of the test antennas 520-522 is repositionable within chamber 523. Thus, the stations 505-507 and the AP 510 can be tested when the test antennas have different angular spreads.

In some embodiments, AP 510 is disposed on a positioning platform that can rotate or translate horizontally and/or vertically within the chamber 523. Moving or rotating the AP 510 affects the angle of arrival/departure of signals to/from the antennas 520-522 and thus their angular separation. The positioning platform can be controlled by a computer (e.g., computer 232, discussed above) and it can translate and/or rotate in response to control signals from the computer.

In some embodiments, the components illustrated in FIGS. 5A and 5B are the same, substantially the same, or different than the components illustrated in FIG. 2. For example, MU-MIMO stations 505-507 can be disposed in an electrically isolated, semi-anechoic chamber, such as chamber 202. Likewise, the RF paths between the AP 510 and each station 505-507 can include cable coupling, RF feedthroughs, attenuators and the like, as discussed above. In addition, the AP 510 can be connected to a computer (e.g., as discussed above) to run one or more tests.

Figure 6:
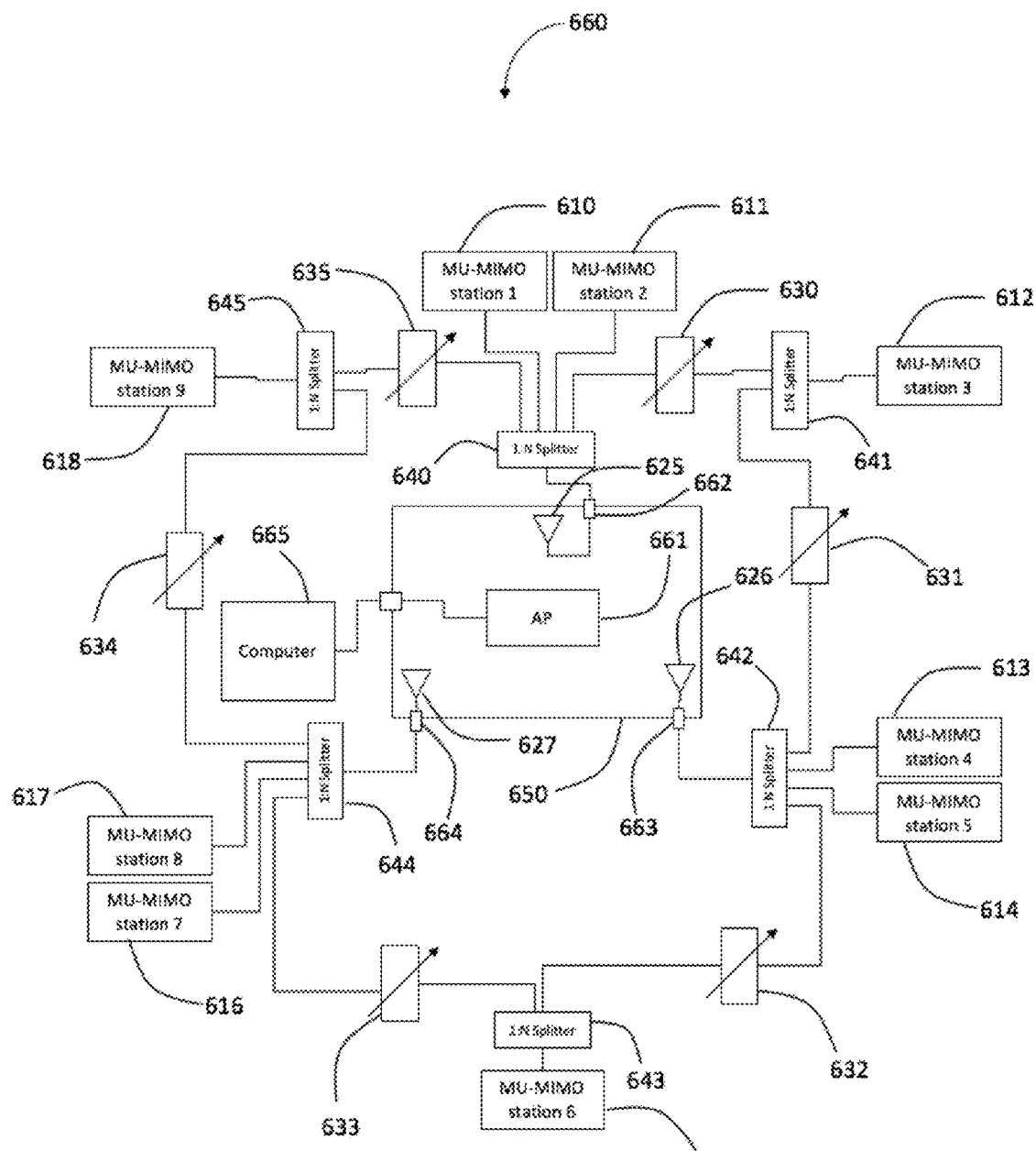
FIG. 6 illustrates an exemplary MU-MIMO test configuration with nine MU-MIMO stations and three test antennas according to one or more embodiments.

FIG. 6 illustrates an exemplary MU-MIMO test configuration with nine MU-MIMO stations 610-618, three test antennas 625-627, and an AP 661 according to one embodiment of this invention. The test antennas 625-627 and AP 661 are disposed in an electrically-isolating semi-anechoic chamber 650. In some embodiments, the test antennas 625-627 are disposed in chamber 650 in the same manner or in substantially the same manner as test antennas 520-522, described above. AP 661 is coupled to computer 665 via a filtered Ethernet connection built into the wall of chamber 650 (e.g., as discussed above) in order to run one or more tests.

Test antenna 627 is coupled to the common port on splitter 644 (e.g., a 1:N or a 1:M splitter) through RF feed-through connector 664 in a chamber 650 wall, forming an RF path between the test antenna 627 and the common port on splitter 644. Two of the RF ports on splitter 644 couple directly to the antenna ports of MU-MIMO stations 616, 617. MU-MIMO station 617 and MU-MIMO station 616 therefore couple to test antenna 627. Since MU-MIMO stations 616 and 617 radiate test signals through the same test antenna 627, their transmissions radiate from the same angular position and have the same AoA at the AP 661, and therefore emulate a co-located group of MU-MIMO capable stations. Since the transmissions from MU-MIMO stations 616 and 617 radiate from the same angular position, the AP 661 treats these stations as being in the same MU-MIMO group, causing the beamforming mechanism on AP 661 to group MU-MIMO stations 616 and 617 into the same MU-MIMO group. An MU-MIMO-capable AP can transmit to or receive from MU-MIMO stations in separate MU-MIMO groups simultaneously, but can only transmit to or receive from one MU-MIMO station in each MU-MIMO group simultaneously.

A third RF port on splitter 644 couples through attenuator 634 and one of the RF ports on splitter 645 (e.g., a 1:X splitter) and through splitter 645 to the antenna port of MU-MIMO station 618. In this way, MU-MIMO station 618 is coupled to test antenna 627. By changing the magnitude of attenuation at attenuator 634, the power level of transmissions from MU-MIMO station 618 through test antenna 627 can be controlled. A fourth RF port on splitter 644 couples through attenuator 633 and one of the RF ports on splitter 643 and through splitter 643 to the antenna port of MU-MIMO station 615. In this way, MU-MIMO station 615 is coupled to test antenna 627. By changing the magnitude of attenuation at attenuator 633, the power level of transmissions from MU-MIMO station 615 through test antenna 627 can be controlled.

In the same way that splitter 644 couples directly to MU-MIMO station 617 and MU-MIMO station 616 and to MU-MIMO station 618 through attenuator 645 and to MU-MIMO station 615 through attenuator 633, so too do splitters 640 and 642 each couple to four MU-MIMO stations. Two RF ports on splitter 640 couple directly to MU-MIMO stations 610 and 611, one RF port of splitter 640 couples through attenuator 635 and through splitter 645 to MU-MIMO station 618, and one RF port couples through attenuator 630 and through splitter 641 (e.g., a 1:X splitter) to MU-MIMO station 612. Since the common port on splitter 640 couples to test antenna 625 via an RF path that extends from the common port on splitter 640 through feed-through connector 662 in chamber 650 wall, MU-MIMO stations 618, 610, 611, and 612 couple through splitter 640 to test antenna 625. Two RF ports on splitter 642 couple directly to MU-MIMO stations 613 and 614, one RF port couples through attenuator 631 and through splitter 641 to MU-MIMO station 612, and one RF port couples through attenuator 632 and through splitter 643 to MU-MIMO station 615. Since the common port on splitter 642 couples to test antenna 626 via an RF path that extends from the common port on splitter 642 through feed-through connector 663 in chamber 650 wall, MU-MIMO stations 612, 613, 614, and 615 couple through splitter 642 to test antenna 626.

MU-MIMO station 612, 615, and 618 are each coupled to two of the three test antennas 625-627. MU-MIMO station 615 is coupled to the common port of splitter 643 (e.g., a 1:X splitter). A first RF port on splitter 643 couples through attenuator 633 and then couples to said fourth RF port on splitter 644, forming an RF path between the first RF port on splitter 643 and the RF port on splitter 644. Since splitter 644 couples through feed-through connector 664, forming an RF path to test antenna 627, MU-MIMO station 615 is coupled to test antenna 627. By changing the magnitude of attenuation at attenuator 633, the power level of transmissions from MU-MIMO station 615 through test antenna 627 can be controlled. A second RF port on splitter 643 couples through attenuator 632 and then couples to an RF port on splitter 642 forming an RF path between the second RF port on splitter 643 and the RF port on splitter 642. The common port of splitter 642 couples through feed-through connector 663 in a chamber 650 wall to test antenna 626, forming an RF path between the common port of splitter 642 and test antenna 626. In this way, MU-MIMO station 615 is coupled to test antenna 626. By changing the magnitude of attenuation at attenuator 632, the power level of transmissions from MU-MIMO station 615 through test antenna 626 can be controlled. In some embodiments, one or both of the first and second RF ports of splitter 643 are directly coupled to test antennas 626, 627 via RF paths that include feedthrough connectors 664 and 663 (i.e., without the respective RF path passing through splitter 644 or splitter 642), each RF path optionally passing through an attenuator (e.g., one path through attenuator 632 and/or the other path through attenuator 633).

Since MU-MIMO station 615 is coupled to both test antenna 627 and test antenna 626 by respective RF paths that extend from splitter 643 (e.g., a 1:X splitter) to test antennas 626, 627, its test transmissions can radiate through both test antenna 627 and test antenna 626 simultaneously as long as the attenuation at attenuator 633 is not so great as to prevent these test transmissions from reaching test antenna 627 and as long as the attenuation at attenuator 632 is not so great as to prevent these test transmissions from reaching test antenna 626. Since attenuator 633 controls the power of MU-MIMO station 615's transmissions through test antenna 627 and attenuator 632 controls the power of MU-MIMO station 615's transmissions through test antenna 626, changing the relative levels of attenuation on attenuators 633 and 632 therefore changes the relative power of MU-MIMO station 615's transmissions from test antennas 627 and 626. When the relative power of MU-MIMO station 615's transmissions through test antennas 627 and 626 is changed, the apparent/virtual angular position of MU-MIMO station 615 at the AP 661 also changes. Controlling the relative level of attenuation of attenuators 633 and 632 therefore controls the apparent/virtual angular position of MU-MIMO station 615 at AP 661.

MU-MIMO station 615 is connected through attenuator 633 and through splitter 644 to test antenna 627, forming an RF path between MU-MIMO station 615 and test antenna 627, and through attenuator 632 and through splitter 642 to test antenna 626, forming an RF path between MU-MIMO station 615 and test antenna 626. MU-MIMO station 618 is connected through attenuator 635 and through splitter 640 to test antenna 625, forming an RF path between MU-MIMO station 618 and test antenna 625, and through attenuator 634 and through splitter 644 to test antenna 627, forming an RF path between MU-MIMO station 618 and test antenna 627. MU-MIMO station 612 is also connected in the same manner through attenuator 630 and through splitter 640 to test antenna 625, forming an RF path between MU-MIMO station 612 and test antenna 625, and through attenuator 631 and through splitter 642 to test antenna 626, forming an RF path between MU-MIMO station 612 and test antenna 626. The apparent/virtual angular position of MU-MIMO station 618 at AP 661 can be controlled by varying the relative levels of attenuation of attenuators 635 and 634, and the apparent/virtual angular position of MU-MIMO station 612 at AP 661 can be controlled by varying the relative levels of attenuation of attenuators 630 and 631.

Thus, it can be seen that the angular position of MU-MIMO stations 612, 615, and 618 can be controlled such that they are virtually positioned between the two respective antennas to which they are coupled.

In some embodiments, one or more of the stations 610-618 is/are disposed in an electrically isolated, semi-anechoic chamber. In some embodiments, all stations 610-618 are disposed in the same electrically isolated, semi-anechoic chamber. In other embodiments, each station 610-618 is disposed in a separate electrically isolated, semi-anechoic chamber. In some embodiments, a first group of stations 610-618 is disposed in one electrically isolated, semi-anechoic chamber and a second group of stations is disposed in another electrically isolated, semi-anechoic chamber.

Figure 7:
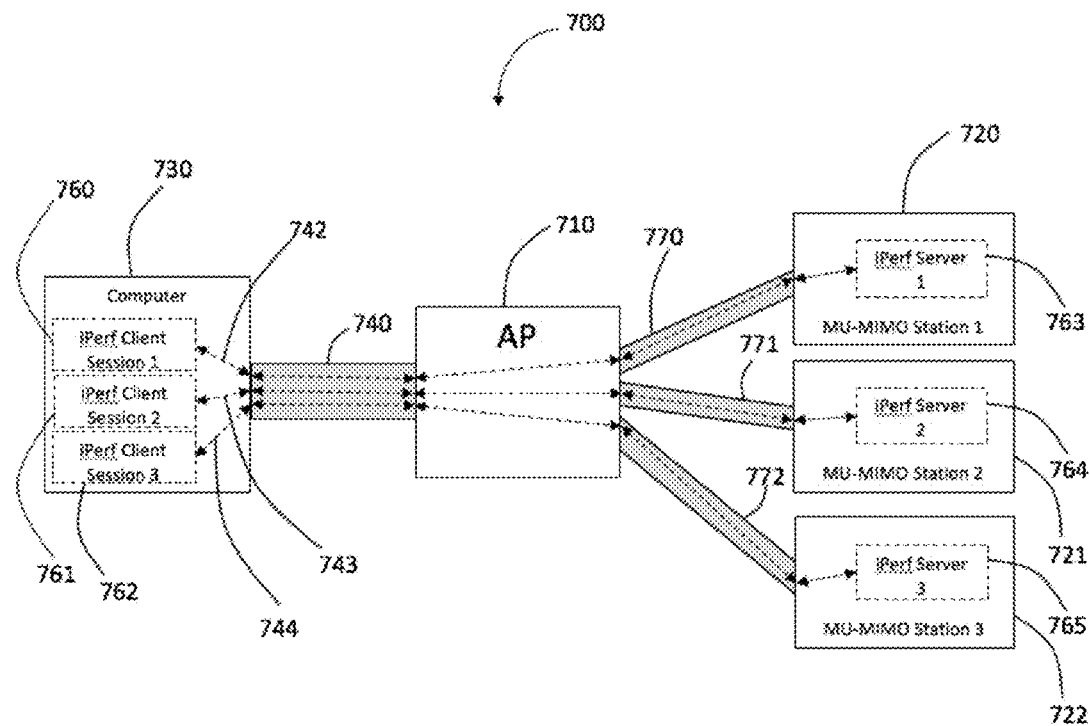
FIG. 7 illustrates is a schematic block diagram of an exemplary MU-MIMO test configuration and method according to one or more embodiments.

In FIG. 7, computer 730 is coupled via Ethernet connections 740 to the AP 710, which in turn is coupled to each MU-MIMO station 720-722 via separate OTA coupling 770-772. To measure throughput between the computer 730 and each of the MU-MIMO stations 720-722 simultaneously, a point-to-multipoint throughput test is implemented. A point-to-multipoint throughput test is a throughput test where a single node in a computer network establishes communication sessions with a plurality of other network nodes and runs traffic between itself and each other node simultaneously. In FIG. 7, each of the MU-MIMO stations 720-722 uses the computer program iPerf to initialize a single iPerf server session 763-765. Computer 730 then initializes three separate iPerf client sessions 760-762. Each iPerf client session establishes a communication session with one of the iPerf server sessions (iPerf client session 760 establishes communications link 742 with iPerf server 763, iPerf client session 761 establishes communications link 743 with iPerf server 764, and iPerf client session 762 establishes communications link 744 with iPerf server 765). Finally, traffic flows are run simultaneously between iPerf client session 1 760 and iPerf server 763, iPerf client session 761 and iPerf server 764, and iPerf client session 762 and iPerf server 765. The total aggregate throughput for this system 700 is equal to the sum of the throughput measurements at MU-MIMO stations 720-722. Those skilled in the arts recognize that this is just one configuration and that many other configurations are possible. For example, the number of MU-MIMO stations 720-722 is variable and the RF paths between the computer 730, AP 710, and MU-MIMO stations 720 could also be reconfigured to use different mediums.

It is to be appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein. The present materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

What is claimed is:

1. A communication test environment for testing multi-user multiple input multiple output (MU-MIMO) capable devices, comprising:
    a test chamber having electrically isolating walls;
    at least one MU-MIMO capable access point (AP) disposed in the test chamber;
    a plurality of repositionable test antennas distributed within said test chamber, each test antenna having a respective line of sight (LOS) to said AP, wherein an angular position of any of said test antennas about said AP is determined according to an Angle of Arrival (AoA), with respect to an arbitrary reference axis that passes through said AP, of radio frequency (RF), transmissions from said test antenna to said AP;
    a plurality of MU-MIMO capable stations, each MU-MIMO capable station coupled to at least one of said test antennas,
        wherein each said station is coupled to a corresponding at least one RF path extending from its antenna port, through an RF feed-through connector that passes through a test chamber wall, and into said test chamber to connect to at least one of said test antennas,
        wherein a first group (N) of said stations is coupled to a first test antenna, via a 1:N RF splitter and a first RF path that extends from a common port of said 1:N RF splitter to said first antenna through a first RF feed-through connector in a first test chamber wall, so as to emulate a first co-located group of MU-MIMO capable stations connected to said AP at an angular position of said first test antenna,
        wherein a second group (M) of said stations is coupled to a second test antenna, via a 1:M RF splitter and a second RF path that extends from a common port of said 1:M RF splitter to said second antenna through a second RF feed-through connector in the first or a second test chamber wall, so as to emulate a second co-located group of said stations connected to said AP at an angular position of said second test antenna; and
    a computer coupled to the AP, the computer configured to run a first aggregate throughput test when an MU-MIMO mechanism in the AP and in one or more of the stations is enabled, the computer further configured to run a second aggregate throughput test when said MU-MIMO mechanism in the AP or in said one or more of the stations is disabled.

2. The communication test environment of claim 1, wherein the first throughput test comprises sending a first volume of data from the computer simultaneously to said stations via said AP when said MU-MIMO mechanism is enabled, and the second throughput test comprises sending a second volume of data from said computer to said stations via said AP when said MU-MIMO mechanism is disabled.

3. The communication test environment of claim 1, further comprising a positioning platform disposed within said test chamber, on which the AP is mechanically placed, said positioning platform being positionable in response to control signals from said computer or from a second computer to translate said positioning platform, to rotate said platform, or a combination thereof within said test chamber.

4. The communication test environment of claim 1, said RF feed-through connector having a first connection point on an exterior side of said walls and a corresponding second connection point on an interior side of said walls, the first and second connection points in electrical communication with one another so as to enable coupling of an exterior and an interior conductor to the first and second connection points, respectively.

5. The communication test environment of claim 1, further comprising an RF attenuator disposed in at least one of the RF paths.

6. The communication test environment of claim 1, wherein another station is coupled to a common port of a 1:X splitter, the 1:X splitter having at least first and second RF ports, said first RF port coupled to an RF port of the 1:N splitter via a third RF path, said second RF port coupled to an RF port of the 1:M splitter via a fourth RF path, whereby the third station is coupled to the first and second test antennas.

7. The communication test environment of claim 1, further comprising a first RF attenuator disposed in said third RF path and a second RF attenuator disposed in said fourth RF path.

8. The communication test environment of claim 1, wherein at least one of said stations is coupled to a common port of a 1:X splitter, the 1:X splitter having at least first and second RF ports, said first RF port coupled to a first test antenna via a first RF path that passes through a first RF feed-through connector in a first test chamber wall, said second RF port coupled to a second test antenna via a second RF path that passes through a second RF feed-through connector in the first or a second test chamber wall, whereby at least one of said stations is coupled to the first and second test antennas.

9. The communication test environment of claim 8, further comprising a first RF attenuator disposed in said first RF path and a second RF attenuator disposed in said second RF path.

10. The communication test environment of claim 1, wherein said test antennas are spatially distributed about said AP so that a difference between the AoA of said RF transmissions from each pair of adjacent test antennas is maximized.

11. The communication test environment of claim 1, further comprising an RF interference generator coupled to at least one antenna disposed in said test chamber.

12. The communication test environment of claim 1, wherein each MU-MIMO capable station is a P×P MU-MIMO capable station having P antenna ports, each of said P antenna ports coupled to a different RF path, each such RF path extending to at least one of said test antennas, wherein P is an integer greater than or equal to 1.

13. A method for testing multi-user multiple input multiple output (MU-MIMO) capable devices, the method comprising:
  placing an MU-MIMO capable access point (AP) in a test chamber having electrically isolating test chamber walls;
  placing a plurality of repositionable test antennas in said test chamber, wherein each test antenna has a respective line of sight (LOS) to said AP and an angular position of any of said test antennas about said AP is determined according to an Angle of Arrival (AoA) of RF transmissions from said test antenna to said AP with respect to an arbitrary reference axis that passes through said AP;
  coupling each test antenna to at least one MU-MIMO capable station;
  coupling a computer to said AP;
  running a first MU-MIMO aggregate throughput test between said computer and said stations via said AP when an MU-MIMO mechanism in the AP and in one or more of said stations is enabled;
  running a non-MU-MIMO aggregate throughput test when said MU-MIMO mechanism in the AP or in said one or more of said stations is disabled; and
  determining a MU-MIMO gain by dividing a MU-MIMO aggregate throughput by a non-MU-MIMO aggregate throughput.

14. The method of claim 13, further comprising:
  coupling an antenna port of each station in a first group (N) of stations to a first respective RF path that extends from said antenna port to an RF port of a 1:N RF splitter; and
  coupling a common port of said 1:N RF splitter to a second RF path that extends from said common port to a first test antenna in said test chamber via an RF feed-through connector in one of said test chamber walls,
  whereby said first group of stations shares said angular position of said first test antenna and therefore emulates a co-located group of MU-MIMO capable stations coupled to said AP.

15. The method of claim 13, further comprising:
  coupling an antenna port of a first station to a first RF path that extends from said antenna port to a common port of an RF splitter;
  coupling a first RF port of said RF splitter to a second RF path that extends from said first RF port to a first test antenna in said test chamber via a first RF feed-through connector in a first test chamber wall; and
  coupling a second RF port of said RF splitter to a third RF path that extends from said second RF port to a second test antenna in said test chamber via a second RF feed-through connector in the first or a second test chamber wall,
  wherein RF signals emitted by said first and second test antennas emulates a virtual AoA of said first station with respect to said AP, said virtual AoA between a first AoA of said first test antenna and a second AoA of said second test antenna.

16. The method of claim 15, further comprising:
  disposing a first RF attenuator in said second RF path;
  disposing a second RF attenuator in said third RF path;
  adjusting a relative level of attenuation on said first and second attenuators to change a relative power of RF transmissions in said second and third RF paths, whereby said relative level of attenuation controls said virtual AoA of said first station with respect to said AP.

17. The method of claim 13, further comprising spatially distributing said test antennas about said AP so that a difference between the AoA of said RF transmissions from each pair of adjacent test antennas is maximized.

18. The method of claim 13, further comprising electrically coupling an antenna port of one of said wireless stations to an RF path that extends through an RF feed-through connector in one of said test chamber walls and into said test chamber to connect to at least one of said test antennas.

\* \* \* \* \*